3,658,813
1-[β-ARYL-β-(R-OXY)-ETHYL]-IMIDAZOLES
Erik Fred Godefroi and Josephus Leo L. C. M. Schuermans, Turnhout, Belgium, assignors to Janssen Pharmaceutica, N.V.
No Drawing. Filed Jan. 13, 1970, Ser. No. 2,656
Int. Cl. C07d 49/36
U.S. Cl. 260—240 K                27 Claims

ABSTRACT OF THE DISCLOSURE

The compounds are of the class of 1-[β-aryl-β-(R-oxy)-ethyl]-imidazoles, wherein R is alkyl, alkenyl, phenylalkenyl, halophenyl alkenyl or alkynyl, useful for their anti-fungal and anti-bacterial activity.

---

This invention relates to novel imidazole derivatives and, more particularly, to 1-[β-aryl-β-(R-oxy-ethyl)]-imidazoles having the following formula:

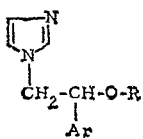

and the therapeutically active acid addition salts thereof, wherein Ar is a member selected from the group consisting of halophenyl, dihalophenyl, lower alkyl phenyl, lower alkyloxy phenyl and 5-halo-2-thienyl, and R is a member selected from the group consisting of lower alkyl, lower alkenyl, phenyl lower alkenyl, halophenyl lower alkenyl and lower alkynyl.

As used herein, "lower alkyl" may be straight or branch chained saturated hydrocarbons having from 1 to about 8 carbon atoms, such as, for example, methyl, ethyl, propyl, isopropyl, butyl, sec-butyl, pentyl, hexyl, heptyl, octyl and the like; "lower alkenyl" and "lower alkynyl" may be unsaturated hydrocarbons having from 3 to about 5 carbon atoms wherein the unsaturated bonding occurs, in relation to the ether linkage, at the beta-, gamma- or delta-carbon atoms, preferably, allyl and propargyl, respectively; and "halo" refers to halogens of atomic weight less than 127, i.e., fluoro, iodo, bromo and chloro.

The ethers of Formula I are easily prepared by the O-alkylation of an appropriate α-Ar-imidazole-1-ethanol of Formula II, wherein Ar is as previously described, for example, by contacting such alcohol (II), the hydroxyl of which has been preliminarily converted to alkali metal salt form by treatment with an appropriate strong base such as an alkali metal amide or hydride, with an appropriate halide of Formula III, wherein Y is halo, preferably chloro or bromo, and R is as previously described. Suitable solvents for the O-alkylation procedure include the aromatic hydrocarbons, e.g., benzene, toluene, xylene and the like; the dialkylformamides, e.g., dimethylformamide and diethylformamide; and ethers such as tetrahydrofuran, 1,2-dimethoxyethane and the like. Elevated temperatures may be advantageously employed to accelerate the rate of reaction. The resulting imidazole product may be recovered from the reaction mixture according to conventional isolation procedures either as the free base, or, if so desired, in the form of an acid addition salt by treatment with a suitable acid. The foregoing O-alkylation procedure may be further illustrated by the following schematic diagram:

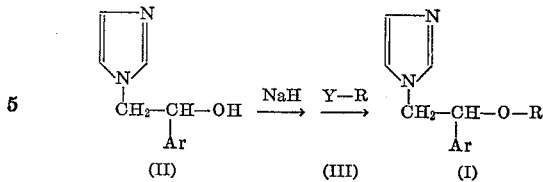

The alcohols (II) are obtainable as follows: imidazole, optionally in the form of an alkali metal salt, such as is obtained by treatment with sodium methoxide, is contacted with a compound of the formula

wherein Y and Ar are as previously described, in a suitable organic solvent, e.g., dimethylformamide, benzene and the like. Subsequent addition of water to the reaction mixture precipitates the desired alcohol (II) which may then be isolated by conventional techniques.

Alternatively, the alcohols (II) may be obtained by the reduction of the carbonyl function of a ketone having the following formula:

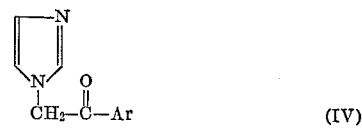

wherein Ar is as previously described. Such reduction may be accomplished by contacting (IV) with a suitable reducing agent, for example, sodium borohydride, lithium aluminium hydride and the like in a suitable solvent, e.g., a lower alkanol.

The ketones (IV) may be prepared by several methods of synthesis (wherein the symbols Y and Ar are as previously defined), as for example:

(A) The known material, N-acetyl-imidazole [see W. Otting, Ber. 89, 1940 (1956)], is contacted with a compound of the formula Y—CH₂—CO—Ar in a suitable organic solvent, e.g., acetonitrile, and preferably under reflux conditions for a few hours. The solvent is subsequently evaporated off and the residue dissolved in water, filtering if necessary. The aqueous solution is treated with an appropriate base, e.g. sodium bicarbonate solution, until about pH 9 to precipitate the corresponding ketone: 1-aroylmethyl-imidazole. If desired, the resulting ketone may be dissolved in a suitable organic solvent and reprecipitated as an acid addition salt by conventional treatment with an acid; or imidazole and a halide of the formula Y—CH₂—CO—Ar are intimately contacted in a suitable solvent, e.g., dimethylformamide, lower alkanol and the like, from which mixture the desired ketone is precipitated by the addition of water, or, the solvent may be evaporated from the mixture and the desired ketone treated with water and extracted with a suitable organic solvent, e.g., chloroform. If desired, the thus-obtained ketone may be converted to its corresponding acid addition salt form by standard treatment with acid; or a ketone of the formula CH₃—CO—Ar is first brominated with liquid bromine according to standard techniques in a suitable organic solvent, e.g., dioxane, ether, methanol and the like, to yield the compound

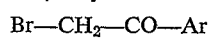

which is then reacted with imidazole to yield the corresponding imidazolylmethyl ketone.

Depending upon the conditions employed during the course of the reactions, the novel compounds (I) herein are obtained either in the form of the free bases or salts thereof. The salt form is converted to the free base form in the usual manner, e.g., by reaction with alkali such as sodium or potassium hydroxide. The compounds in base form may be converted to their therapeutically useful acid addition salts by reaction with an appropriate acid, as, for example, an inorganic acid such as hydrohalic acid, i.e., hydrochloric, hydrobromic or hydroiodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic, 2-acetoxy benzoic acid and the like.

The subject compounds of Formula I and the acid addition salts thereof are useful agents in combatting fungi and bacteria as demonstrated by their broad spectrum of anti-fungal and anti-bacterial action. The data given in the following tables illustrate such activity. The method employed in obtaining the tabulated data is that reported by Vanbreuseghem et al., Chemotherapia, 12, 107 (1967).

The tests on fungi were performed using Sabouraud's liquid medium (1 g. of neopeptone Difco and 2 g. of glucose Difco per 100 ml. distilled water) in 16 x 160 mm. test tubes, each containing 4.5 ml. of liquid medium, autoclaved at 120° C. for 15 minutes. The drug to be tested is primarily dissolved in ethanol 50% at a concentration of 20 mg./ml. and afterwards diluted with sterile distilled water in order to obtain a concentration of 10 mg./ml. Successive decimal dilutions were made in distilled water. To each tube, containing 4.5 ml. of Sabouraud's liquid medium, 0.5 ml. of a dilution of the drug was added in order to obtain $1000\gamma$, $500\gamma$, $100\gamma$, $10\gamma$ and $1\gamma$ per ml. medium (the symbol "$\gamma$" equals "microgram"). A control tube was prepared by adding 0.5 ml. distilled water to 4.5 ml. medium. The concentration of ethanol in the control tubes was the same as in those containing $1000\gamma$ and $500\gamma$/ml. of the drug. The filamentous fungi were incubated at 25° C. for two to three weeks. A square block of 2 mm. side was cut and inoculated in the liquid medium. A three-day-old culture on Sabouraud's liquid medium was used for yeasts. The inoculum was 0.05 ml. per tube. All the cultures were made in duplicate and incubated at 25° C. for 14 days. The first readings were made after 7 days and the final ones after 14 days (the data given in Table I are the final scores observed after 14 days for each compound at the concentration of 100 micrograms per milliliter culture). The score was established assuming a maximum growth for the control tube which was given score 4. The complete absence of growth after 14 days was scored 0, while growths equal to ¼, ½ and ¾ of the controls were rated respectively 1, 2 and 3.

The tests on bacteria were performed on phenol red dextron broth medium (Difco) and on trypton broth medium (Difco) using the same decimal dilution technique as for fungistatic tests. The inoculum size as 0.1 ml. from a 24-hour culture diluted $\frac{1}{10}$ in distilled water for *Streptococcus pyogenes* and 0.05 ml. for the other organa- Streptococcus pyogenes and 0.05 ml. for the other organisms. The results after 72 hours were rate as + or 0, corresponding to the presence or the absence of growth. The data given in Table II ($10\gamma$/ml. concentration) hereafter illustrate such anti-bacterial action.

It is understood that the compounds in the following tables are not listed for purposes of limiting the invention thereto, but only to exemplify the useful properties of all the compounds within the scope of Formula I, including the pharmaceutically acceptable acid addition salts thereof.

TABLE I.—FUNGISTATIC ACTIVITY

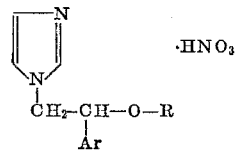

| Ar | R | Final score at 100 μg./ml.** | | | | | | | | | | |
|---|---|---|---|---|---|---|---|---|---|---|---|---|
| | | 1 | 2 | 3 | 4 | 5 | 6 | 7 | 8 | 9 | 10 | 11 |
| 2-Cl-Ph | $C_6H_{13}$ | 0 | 0 | 0 | 0 | 0 | 3 | 0 | 1 | 0 | 0 | 0 |
| 4-F-Ph | $C_7H_{15}$ | 0 | 0 | 0 | 0 | 0 | 2 | 0 | 3 | 0 | 0 | 0 |
| 2,4-di-Cl-Ph | $C_4H_9$ | 0 | 0 | 0 | 0 | 0 | 1 | 1 | 4 | 0 | 0 | 0 |
| 2,4-di-Cl-Ph | Allyl | 0 | 0 | 0 | 0 | 0 | 1 | 0 | 4 | 0 | 0 | 0 |
| 2,4-di-Cl-Ph | $C_8H_{17}$ | 0 | 0 | 0 | 0 | 0 | 3 | 4 | 1 | 0 | 0 | 0 |
| 2,4-di-Cl-Ph | $CH_2C \equiv H$ | 0 | 0 | 0 | 0 | 0 | 2 | 1 | 4 | 0 | 0 | 0 |
| 2,6-di-Cl-Ph | $C_4H_9$ | 0 | 0 | 0 | 1 | 0 | 1 | 0 | 4 | 0 | 0 | 0 |
| 2,4-di-Cl-Ph | $C_6H_{13}$ | 0 | 0 | 0 | 2 | 0 | 3 | 0 | 0 | 0 | 0 | 0 |
| 2,5-di-Cl-Ph | $C_4H_9$ | 0 | 0 | 0 | 0 | 0 | 3 | 1 | 4 | 0 | 0 | 0 |
| 2,4-di-Cl-Ph | $CH_2-CH=CH-Ph$ | 0 | 0 | 0 | 0 | 0 | 3 | 1 | 0 | 0 | 0 | 0 |
| 4-Br-Ph | $C_4H_9$ | 0 | 0 | 0 | 0 | 0 | 1 | 0 | 2 | 1 | 0 | 0 |
| 4-Cl-Ph | $C_7H_9$ | 0 | 0 | 0 | 0 | 0 | 0 | 0 | 4 | 0 | 0 | 0 |
| 4-F-Ph | $C_2H_5$ | 0 | 0 | 0 | 0 | 0 | 2 | 4 | 4 | 0 | 0 | 0 |
| 4-Br-Ph | $C_2H_5$ | 0 | 0 | 0 | 0 | 0 | 3 | 4 | 4 | 0 | 0 | 0 |
| 4-Cl-Ph | $C_2H_5$ | 0 | 0 | 0 | 0 | 0 | 3 | 3 | 4 | 0 | 0 | 0 |
| 2-Cl-Ph | $C_2H_5$ | 0 | 0 | 0 | 1 | 1 | 4 | 3 | 4 | 0 | 0 | 0 |
| 3,4-di-Cl-Ph | $C_2H_5$ | 0 | 0 | 0 | 1 | 2 | 3 | 0 | 4 | 0 | 0 | 0 |
| 2-Me-Ph | $C_4H_9$ | 0 | 0 | 0 | 0 | 0 | 1 | 1 | 4 | 0 | 0 | 0 |
| 2-Cl-Ph | $CH_2-CH=CH_2$ | 0 | 0 | 0 | 0 | 1 | 1 | 3 | 4 | 0 | 0 | 0 |
| 5-Cl-2,$C_4H_3S$* | $C_4H_9$ | 0 | 0 | 0 | 1 | 0 | 0 | 4 | 4 | 0 | 1 | 1 |
| 2-OMe-Ph | $C_4H_9$ | 0 | 0 | 0 | 0 | 1 | 2 | 2 | 4 | 0 | 0 | 0 |
| 4-F-Ph | $C_4H_9$ | 0 | 0 | 0 | 1 | 0 | 0 | 4 | 4 | 0 | 1 | 1 |
| 2,4-di-Cl-Ph | $CH_2-CH=CH-\text{Ph-Cl}$ | 1 | 0 | 0 | 1 | 0 | 4 | 3 | 4 | 1 | 0 | 0 |
| 2,4-di-Cl-Ph | $CH_2-CH=CH-\text{Ph}-Cl$ | 0 | 0 | 0 | 0 | 0 | 4 | 1 | 0 | 0 | 0 | 0 |
| 2-Cl-Ph | Id | 0 | 0 | 0 | 0 | 0 | 3 | 0 | 3 | 0 | 0 | 0 |

*=5-chloro-2-thienyl,
**1=microsporum canis; 2=trichophyton mentagrophytes; 3=trichophyton rubrum; 4=phialophord verrucosa, 5=cryptococcus neoformans; 6=Cancida tropicalis; 7=candida albicans; 8=mucor; 9=aspergillus fumigatus; 10=sporotrichum schenckii; 11=saprolegnia,

TABLE II.—BACTERICIDAL ACTIVITY

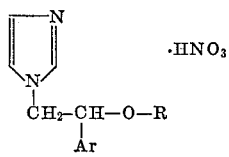

$$\text{CH}_2\text{—CH—O—R}$$
$$|$$
$$\text{Ar}$$

| Ar | R | Final score at 10 μg./ml.** | | | | | |
|---|---|---|---|---|---|---|---|
| | | 1 | 2 | 3 | 4 | 5 | 6 |
| 2-Cl-Ph | $C_6H_{13}$ | + | + | + | 0 | 0 | 0 |
| 4-F-Ph | $C_7H_{15}$ | + | + | + | 0 | + | 0 |
| 2,4-di-Cl-Ph | $C_4H_9$ | + | + | + | 0 | + | 0 |
| 2,4-di-Cl-Ph | Allyl | + | + | + | 0 | + | + |
| 2,4-di-Cl-Ph | $C_8H_{17}$ | + | + | + | 0 | + | 0 |
| 2,4-di-Cl-Ph | $C_2H_5$ | + | + | + | + | + | + |
| 2,4-di-Cl-Ph | $CH_2$—C≡CH | + | + | + | + | + | + |
| 2,6-di-Cl-Ph | $C_4H_9$ | + | + | + | 0 | + | 0 |
| 2,4-di-Cl-Ph | $C_6H_{13}$ | + | + | + | 0 | + | 0 |
| 2,5-di-Cl-Ph | $C_4H_9$ | + | + | + | 0 | + | 0 |
| 2,4-di-Cl-Ph | $CH_2$—$CH_2$=CH—Ph | + | + | + | 0 | + | 0 |
| 4-Br-Ph | $C_4H_9$ | + | + | + | 0 | + | 0 |
| 4-Cl-Ph | $C_4H_9$ | + | + | + | 0 | + | 0 |
| 4-F-Ph | $C_2H_5$ | + | + | + | + | + | + |
| 4-Br-Ph | $C_2H_5$ | + | + | + | + | + | + |
| 4-Cl-Ph | $C_2H_5$ | + | + | + | + | + | + |
| 2-Cl-Ph | $C_2H_5$ | + | + | + | + | + | + |
| 3,4-di-Cl-Ph | $C_2H_5$ | + | + | + | + | + | + |
| 2-Me-Ph | $C_4H_9$ | + | + | + | 0 | + | 0 |
| 2-Cl-Ph | $CH_2$—CH=$CH_2$ | + | + | + | + | + | + |
| 5-Cl-2.$C_4H_3S$ * | $C_4H_9$ | + | + | + | 0 | + | + |
| 2-OMe-Ph | $C_4H_9$ | + | + | + | + | + | + |
| 4-F-Ph | $C_4H_9$ | + | + | + | 0 | + | + |
| 2,4-di-Cl-Ph | $CH_2$—CH=CH—C$_6$H$_4$Cl (o) | + | + | + | 0 | 0 | 0 |
| 2,4-di-Cl-Ph | $CH_2$—CH=CH—C$_6$H$_4$—Cl | + | + | + | 0 | 0 | 0 |
| 2-Cl-Ph | Id | + | + | + | 0 | 0 | 0 |

*5-chloro-2-thienyl.
**1=Salmonella pullorum gallinarum;2=escherichia coli; phialophord 3=pseudomenas aeruginosa; 4=erysipelothrix insidiosa; 5=staphylococcus hemolyticus; 6=streptococcus pyrogenes.

It is obvious from Formula (I) that the carbon atom to which the Ar group is attached is asymmetric and, consequently, the resolution and isolation or the production of a particular optical isomer can be accomplished by application of general principles known in the art. Said isomers are naturally intended to be included within the scope of this invention.

The following examples are intended to illustrate, but not to limit, the scope of the present invention. Unless otherwise stated, all parts are by weight.

EXAMPLE I

To a solution of 20.4 parts of imidazole in 40 parts of methanol are added 23.3 parts of o-chlorophenacylbromide and the whole is stirred for 2 hours at 0° C. The solvent is evaporated in vacuo and the residue is poured onto water. The product, 2'-chloro-2-(1-imidazolyl)acetophenone, is extracted with chloroform. The extract is washed with water, dried, filtered and evaporated. From the free base, the hydrochloride salt is prepared in the standard manner (with ethanolic HCl), yielding, after two recrystallizations: first from a mixture of 2-propanol and diisopropylether and then from a mixture of methanol and diisopropylether, about 12 parts of 2'-chloro-2-(1-imidazolyl)-acetophenone hydrochloride; M.P. 186.5–189° C. Treatment of this acid addition salt with an equivalent amount of sodium hydroxide yields the free base.

To a suspension of 40 parts of 2'-chloro-2-(1-imidazolyl)-acetophenone in 120 parts of methanol are added portionwise 4 parts of sodium borohydride while cooling on ice and while stirring. After 30 minutes, the reaction mixture is stirred and refluxed for 1 hour. Then 100 parts of water are added and the methanol is removed at atmospheric pressure. After the addition of 16 parts of concentrated hydrochloric acid solution, the whole is stirred and refluxed for 5 minutes. The whole is cooled on an ice-bath and an excess of ammonium hydroxide solution is added and the product is extracted with methylene chloride. The extract is washed with water, dried, filtered and evaporated in vacuo. From the oily free base, α-(o-chlorophenyl)imidazole-1-ethanol, the nitrate salt is prepared by the addition of concentrated nitric acid, yielding, after recrystallization of the crude solid salt from a mixture of methanol and diisopropylether, about 34.5 parts of α-(o-chlorophenyl)imidazole-1-ethanol nitrate; M.P. 143° P.

To a stirred and warmed (50° C.) suspension of 1.8 parts of sodium hydride 50% in 36 parts of tetrahydrofuran is added portionwise a solution of 6.6 parts of α-(o-chlorophenyl)imidazole-1-ethanol nitrate in 10 parts of dimethylformamide and the whole is stirred and refluxed for 2 hours. Then there are added 6.6 parts of hexylbromide and stirring at reflux is continued for another 16 hours. The reaction mixture is diluted with 160 parts of ether, while stirring. The organic phase is washed five times with water and acidified with an excess of concentrated nitric acid. Petroleum-ether (160 parts) is added and the crystallized salt is filtered off. It is recrystallized from a mixture of ethanol and diisopropylether, yielding 1 - [o - chloro-β-(hexyloxy)phenethyl]imidazole nitrate; M.P. 103.1° C.

EXAMPLE II

To a solution of 276 parts of p-fluoro-acetophenone in 400 parts of dioxane and 640 parts of dry ether are added dropwise 320 parts of bromine, while cooling on ice and while stirring. After the reaction has been started at room temperature, the solvent is removed in vacuo, till an internal temperature of 110° C. is obtained. The residue is cooled on an ice-salt bath and there are added 640 parts of acetone. At a temperature of 0° C., there is added a solution of 528 parts of imidazole in 640 parts of methanol, while stirring. The whole is further stirred for 3 hours while cooling. The solvent is removed at atmospheric pressure till 125° C. internal temperature. To the residue are added, after cooling, 750 parts of chloroform and 500 parts of water. The chloroform layer is separated, stirred for 30 minutes, washed with water, dried, filtered and evaporated. From the residue, the hydrochloride salt is prepared in the usual manner. The crude salt is recrystallized twice from a mixture of 2-propanol, methanol and diisopropylether. The free base is liberated by treatment with alkali and after recrystallization from a mixture of 2-propanol and diisopropylether, about 178.5 parts of 1-(p-fluorophenacyl)imidazole are obtained; M.P. 149–155° C.

To a suspension of 35 parts of 1-(p-fluorophenacyl)imidazole in 80 parts of methanol are added portionwise 3.4 parts of sodium borohydride while cooling on ice and while stirring. After 30 minutes, the reaction mixture is stirred and refluxed for one hour and 100 parts of water are added. The methanol is removed at atmospheric pressure. Then there are added 16 parts of concentrated hydrochloric acid solution and the whole is stirred and refluxed for 5 minutes. After cooling on an ice-bath, an excess of ammonium hydroxide solution is added, whereupon the product is precipitated. It is filtered off, washed with water and recrystallized from a mixture of dimethylformamide and water, yielding about 27 parts of $\alpha$-(p-fluorophenyl)imidazole-1-ethanol; M.P. 146.5° C.

To a stirred and warm (50° C.) suspension of 1.8 parts of sodium hydride 50% in 40 parts of tetrahydrofuran is added portionwise a solution of 6.1 parts of $\alpha$-(p-fluorophenyl)imidazole-1-ethanol in 10 parts of dimethylformamide and the whole is stirred and refluxed for 2 hours. Then there are added 7.2 parts of heptylbromide and stirring at reflux is continued for another 16 hours. The reaction mixture is diluted with 160 parts of ether while stirring. The organic phase is washed five times with water and acidified with an excess of concentrated nitric acid. Petroleum ether (160 parts) is added and the crystallized salt is filtered off. It is recrystallized from a mixture of ethanol and diisopropylether, yielding 1-[p-fluoro-$\beta$-(heptyl)phenethyl]imidazole nitrate; M.P. 83.6° C.

EXAMPLE III

A solution of 50 parts of 2',4'-dichloroacetophenone in 400 parts of refluxing methanol is brominated with 41.5 parts of bromine, while stirring. After the addition is complete, the mixture is cooled in an ice-bath and there are added 90 parts of imidazole while stirring. Upon completion, stirring is continued for another 3 hours. The solvent is removed in vacuo. The residue is poured onto water and the product is extracted with methylene chloride. The extract is washed with water, dried, filtered and evaporated in vacuo. From the oily free base, the nitrate salt is prepared in the usual manner. The precipitated solid salt is filtered off and recrystallized from water, yielding about 45 parts of 2',4'-dichloro-2-(1-imidazolyl)acetophenone nitrate; M.P. 164.5° C. Treatment of the salt with ammonium hydroxide solution yields the corresponding free base.

To a suspension of 40 parts of 2',4'-dichloro-2-(1-imidazolyl)acetophenone in 120 parts of methanol are added portionwise 3.2 parts of sodium borohydride, while cooling on ice and stirring. After 30 minutes, the reaction mixture is stirred and refluxed for one hour and then 100 parts of water are added. The methanol is removed at atmospheric pressure. Then there are added 20 parts of concentrated hydrochloric acid solution and the whole is stirred at reflux for 5 minutes. After cooling, an excess of concentrated ammonium hydroxide solution is added, whereupon the product is precipitated. It is filtered off and recrystallized from a mixture of dimethylformamide and water, yielding about 31 parts of $\alpha$-(2,4-dichlorophenyl)imidazole-1-ethanol; M.P. 136.5° C.

To a stirred and warm (50° C.) suspension of 1.8 parts of sodium hydride 50% in 36 parts of tetrahydrofuran is added portionwise a solution of 7.7 parts of $\alpha$-(2,4-dichlorophenyl)-imidazole-1-ethanol in 10 parts of dimethylformamide and the whole is stirred and refluxed for 2 hours. Then there are added 5.5 parts of n-butylbromide and stirring at reflux is continued for another 16 hours. Ether is added (160 parts) and the resulting solution is washed five times with water. Upon acidification with concentrated nitric acid and the addition of petroleum ether, the nitrate salt is crystallized. It is filtered off and recrystallized twice: first from a mixture of acetone and diisopropylether and then from a mixture of ethanol and diisopropylether, yielding about 4 parts of 1-($\beta$-butoxy-2,4-dichlorophenethyl)imidazole nitrate; M.P. 126.3° C.

EXAMPLE IV (A) To a stirred and warmed (50° C.) suspension of 1.8 parts of sodium hydride 50% in 36 parts of tetrahydrofuran is added portionwise a solution of 7.7 parts of $\alpha$-(2,4-dichlorophenyl)imidazole-1-ethanol in 15 parts of dimethylformamide and the whole is stirred at reflux temperature for 2 hours. Then there are added 3.1 parts of allyl chloride and stirring at reflux is continued for 16 hours. The reaction mixture is diluted with 160 parts of ether. The solution is washed five times with water and then acidified by the addition of an excess of concentrated nitric acid. Upon the addition of 240 parts of petroleum ether, the product is crystallized. It is filtered off and recrystallized from a mixture of 2-propanol and diisopropylether, yielding about 6 parts of 1-[2,4-dichloro-$\beta$-(allyloxy)phenethyl]imidazole nitrate; M.P. 89.9° C.

(B) The procedure of Example IV–A is repeated except that an equivalent quantity of 2-butenyl chloride and 3-pentenyl chloride are substituted for the allyl chloride used therein to yield, as respective products:

1-[2,4-dichloro-$\beta$-(2-butenyloxy)phenethyl]imidazole nitrate; and

1-[2,4-dichloro-$\beta$-(3-pentenyloxy)phenethyl]imidazole nitrate.

EXAMPLE V

To a stirred and warmed (50° C.) suspension of 1.8 parts of sodium hydride dispersion 50% in 36 parts of tetrahydrofuran is added portionwise a solution of 7.7 parts of $\alpha$-(2,4-dichlorophenyl)imidazole-1-ethanol in 10 parts of dimethylformamide and the whole is stirred and refluxed for 1.5 hrs. Then there are added 7.7 parts of octylbromide and stirring at reflux temperature is continued for another 16 hours. Ether (160 parts) is added and the solution is washed five times with water. Upon the addition of an excess of concentrated nitric acid, the nitrate salt is precipitated. It is filtered off and recrystallized twice: first from a mixture of acetone and diisopropylether and then from a mixture of ethanol and diisopropylether, yielding about 3.5 parts of 1-[2,4-dichloro-$\beta$-(octyloxy)phenethyl]imidazole nitrate; M.P. 99° C.

EXAMPLE VI

To a stirred and warmed (50° C.) suspension of 1.8 parts of sodium hydride dispersion 50% in 40 parts of tetrahydrofuran is added portionwise a solution of 7.7 parts of $\alpha$-(2,4-dichlorophenyl)imidazole-1-ethanol in 15 parts of dimethylformamide and the whole is stirred at reflux for 2 hours. Then there are added 4.4 parts of ethyl bromide and stirring and refluxing is continued for an additional 16 hours. Ether (160 parts) is added and the solution is washed five times with water. Upon the addition of concentrated nitric acid, the product is precipitated. It is filtered off and recrystallized from a mixture of ethanol and diisopropylether, yielding about 7 parts of 1-(2,4-dichloro - $\beta$ - ethoxyphenethyl)imidazole nitrate; M.P. 109–1° C.

EXAMPLE VII (A) To a stirred and warmed (50° C.) suspension of 1.8 parts of sodium hydride 50% in 40 parts of tetrahydrofuran is added portionwise a solution of 7.7 parts of α-(2,4-dichlorophenyl)imidazole-1-ethanol in 15 parts of dimethylformamide and the whole is stirred for 2 hours at reflux temperature. Then there are added 3 parts of 2-propynyl chloride and stirring at reflux is continued for another 16 hours. Ether (160 parts) is added and the solution is washed five times with water. The organic phase is acidified with concentrated nitric acid and evaporated. The residue is crystallized from a mixture of 2-propanol and diisopropylether. The less pure nitrate salt is triturated in ice-cold acetone and recrystallized once more from 2-propanol, yielding about 3 parts of pure 1-[2,4-dichloro-β - (2 - propynyloxy)phenethyl]imidazole nitrate; M.P. 125.3° C.

(B) The procedure of Example VII–A is repeated except that an equivalent amount of 2-butynyl chloride and 3-pentynyl chloride is used in place of the 2-propynyl chloride used therein to yield, as respective products:

1-[2,4-dichloro-β-(2-butynyloxy)phenethyl]imidazole nitrate; and
1-[2,4-dichloro-β-(3-pentynyloxy)phenethyl]imidazole nitrate.

EXAMPLE VIII

To 4.5 parts of sodium methoxide solution 30% in 15 parts of dimethylformamide and 16 parts of benzene are added 2 parts of imidazole and the solvent is distilled off till a temperature of 130° C. is reached. Then there is added dropwise a solution of 5.4 parts of α-(bromomethyl)-2,6-dichlorobenzyl alcohol in 4 parts of benzene at a temperature of 125° C. Upon completion, the temperature is brought again to 130° C. The reaction mixture is cooled gradually to 40° C. and there are added successively 50 parts of water and 32 parts of diisopropylether, whereupon the product is crystallized. It is filtered of, washed with ether, triturated in ice-cold acetone and recrystallized from a mixture of dimethylformamide and water, yielding about 1.5 parts of α-(2,6-dichlorophenyl)imidazole-1-ethanol; M.P. 131.6° C.

To a stirred suspension of 1.8 parts of sodium hydride dispersion 50% in 40 parts of tetrahydrofuran is added portionwise a solution of 7.7 parts of α-(2,6-dichlorophenyl)imidazole-1-ethanol in 15 parts of dimethylformamide at 50° C. Upon completion, the whole is further stirred at reflux temperature for 2 hours. Then there are added 5.5 parts of n-butyl bromide and stirring and refluxing is continued for another 16 hours. The reaction mixture is diluted with 160 parts of ether. The solution is washed five times with water and upon acidification with an excess of concentrated nitric acid solution, the solid nitrate salt is crystallized. It is filtered off and recrystallized from a mixture of ethanol and diisopropylether, yielding about 6 parts of 1-(2,6-dichloro-β-butoxyphenethyl)imidazole nitrate; M.P. 129.2° C.

EXAMPLE IX

To a stirred and warmed (50° C.) suspension of 1.8 parts of sodium hydride dispersion 50% in 36 parts of tetrahydrofuran is added portionwise a solution of 7.7 parts of α-(2,4-dichlorophenyl)imidazole-1-ethanol in 15 parts of dimethylformamide and the whole is stirred and refluxed for 2 hours. Then there are added 6.6 parts of n-hexyl bromide and stirring at reflux is continued for another 16 hours. Ether (160 parts) is added and the solution is washed five times with water. Upon acidification with an excess of concentrated nitric acid solution, the solid nitrate salt is crystallized. It is filtered off and recrystallized twice: first from a mixture of ethanol and diisopropylether and then from 2-propanol, yielding 1 - [2,4-dichloro-β-hexyloxy)phenethyl]imidazole nitrate; M.P. 114.4° C.

EXAMPLE X

To a solution of 4.5 parts of sodium methoxide solution 30% in 16 parts of benzene and 15 parts of dimethylformamide are added 2 parts of imidazole. The solvent is distilled off till an internal temperature of 130° C. is reached. Then there is added dropwise a solution of 5.5 parts of α-(bromomethyl)-2,5-dichlorobenzyl alcohol in 12 parts of benzene, whereupon the temperature falls to 110° C. Upon completion, the temperature is brought again to 130° C. to remove the solvent. The reaction mixture is cooled slowly to 50° C. and there are added 100 parts of water and 40 parts of diisopropylether. On further cooling to room temperature, the product is crystallized. It is filtered off, washed successively with ether and acetone and recrystallized from a mixture of dimethylformamide and water (minimal quantities), yielding α - (2,5 - dichlorophenyl)imidazole-1-ethanol; M.P. 145.3° C.

To a stirred and warmed (50° C.) suspension of 1.8 parts of sodium hydride dispersion 50% in 40 parts of tetrahydrofuran is added portionwise a solution of 7.7 parts of α-(2,5-dichlorophenyl)imidazole-1-ethanol in 15 parts of dimethylformamide and the whole is stirred and refluxed for 2 hours. Then there are added 5.5 parts of n-butyl bromide and stirring at reflux is continued for another 16 hours. Ether (160 parts) is added and the solution is washed five times with water. Upon acidification with an excess of concentrated nitric acid solution, the solid nitrate salt is crystallized. It is filtered off and recrystallized from a mixture of ethanol and diisopropylether, yielding 1-(β-butoxy-2,5-dichlorophenethyl)-imidazole nitrate; M.P. 130.5° C.

EXAMPLE XI

To a stirred mixture of 199 parts of 4'-bromoacetophenone in 320 parts of ether and 160 parts of dioxane are added dropwise 160 parts of bromine. After the addition is complete, the whole is stirred for one hour. The mixture is cooled on ice and there are added 350 parts of bromine in 400 parts of methanol. After stirring overnight, the solvents are taken off till an internal temperature of 90° C. Then 100 parts of water are added and the crude solid product is filtered off. The latter is taken up in 1000 parts of hot chloroform and on the addition of water, some by-product is precipitated. It is filtered off and from the filtrate, the chloroform phase is separated, washed with water and an excess of concentrated nitric acid solution is added. The nitrate salt is triturated in 320 parts of dimethylformamide, basified with ammonium hydroxide and on the addition of water, the free base is precipitated. It is filtered off and recrystallized from toluene, yielding about 90 parts of 4'-bromo-2-(1-imidazolyl)acetophenone; M.P. 164° C.

To a stirred and cooled (5° C.) mixture of 123 parts of 4'-bromo-2-(1-imidazolyl)acetophenone in 600 parts of methanol are added portionwise 9.1 parts of sodium borohydride. The whole is stirred on ice for one hour and further at reflux temperature for one hour. Then 480 parts of methanol are removed. To the residue are added 100 parts of water and then diluted hydrochloric acid solution till pH 3. The whole is stirred and refluxed for 5 minutes. After alkalinization with sodium hydroxide solution, the product is precipitated. It is filtered off and recrystallized from 2-propanol, yielding about 76 parts of α-(p-bromophenyl)imidazole-1-ethanol; M.P. 188.5° C.

To a stirred and warm (50° C.) suspension of 1.8 parts of sodium hydride dispersion 50% in 40 parts of tetrahydrofuran is added portionwise a solution of 8 parts of α-(p-bromophenyl)imidazole-1-ethanol in 15 parts of dimethylformamide and the whole is stirred and refluxed for 2 hours. Then there are added 5.5 parts of n-butyl bromide and stirring at reflux is continued for another 16 hours. Ether (160 parts) is added and the solution is washed five times with water. Upon acidification with concentrated nitric acid solution and the addition of 80 parts of petroleum ether, the nitrate salt is crystallized. It is filtered off and recrystallized from a mixture of 2-propanol and diisopropylether, yielding about 4 parts of 1-(p - bromo-β-butoxyphenethyl)imidazole nitrate; M.P. 77.8° C.

EXAMPLE XII

To a stirred and refluxing solution of 12.1 parts of 1-acetyl-imidazole in 40 parts of acetonitrile is added dropwise a solution of 23.3 parts of 4-chloro-phenacylbromide in 40 parts of acetonitrile in the course of 30 minutes. After the addition is complete, the reaction mixture is stirred and refluxed for 2 hours. The solvent is evaporated. The residue is dissolved in water. To this solution is added a solution of sodium carbonate in water until pH 9, whereupon the solid free base is precipitated. It is filtered off and dissolved in acetone. To this solution is added 2-propanol previously saturated with gaseous hydrogen chloride. The salt is precipitated and recrystallized from a mixture of 2-propanol and acetone, yielding 1 - (4 - chloro-benzoylmethyl)-imidazole hydrochloride; M.P. 228–229° C. Treatment of the hydrochloride salt with sodium hydroxide solution yields the corresponding free base.

To a suspension of 40 parts of 1-(p-chlorobenzoyl-methyl)imidazole in 120 parts of methanol are added portionwise 4 parts of sodium borohydride while cooling on ice and while stirring. After 30 minutes, the reaction mixture is stirred and refluxed for one hour and 100 parts of water are added. The methanol is removed at atmospheric pressure. Then there are added 16 parts of concentrated hydrochloric acid solution and the whole is stirred and refluxed for 5 minutes. After cooling on ice-bath, an excess of ammonium hydroxide solution is added, whereupon the product is precipitated. It is filtered off, washed with water and recrystallized from a mixture of dimethylformamide and water, yielding α-(p-chlorophenyl)-1-imidazoleethanol; M.P. 180° C.

To a stirred and warmed (50° C.) suspension of 1.8 parts of sodium hydride dispersion 50% in 40 parts of tetrahydrofuran is added portionwise a solution of 6.6 parts of α-(p-chlorophenyl)-1-imidazoleethanol in 15 parts of dimethylformamide and the whole is stirred and refluxed for 2 hours. Then there are added 5.5 parts of n-butyl bromide and stirring at reflux is continued for another 16 hours. Ether (160 parts) is added and the solution is washed five times with water. After acidification with concentrated nitric acid and the addition of 80 parts of petroleum ether, the nitrate salt is crystallized. It is filtered off and recrystallized from a mixture of 2-propanol and diisopropylether, yielding 1-(β-butoxy-p-chlorophenethyl)imidazole nitrate; M.P. 86.5° C.

EXAMPLE XIII

To a suspension of 35 parts of 1-(p-fluorophenacyl)-imidazole in 80 parts of methanol are added portionwise 3.4 parts of sodium borohydride while cooling on ice and while stirring. After 30 minutes, the reaction mixture is stirred and refluxed for one hour and 100 parts of water are added. The methanol is removed at atmospheric pressure. Then there are added 16 parts of concentrated hydrochloric acid and the whole is stirred and refluxed for 5 minutes. After cooling on an ice-bath, an excess of ammonium hydroxide solution is added, whereupon the product is precipitated. It is filtered off, washed with water and recrystallized from a mixture of dimethylformamide and water, yielding α-(p-fluorophenyl)imidazole-1-ethanol; M.P. 146.5° C.

To a stirred and warmed (50° C.) suspension of 1.8 parts of sodium hydride dispersion 50% in 40 parts of tetrahydrofuran is added portionwise a solution of 6.1 parts of α-(p-fluorophenyl)-imidazole-1-ethanol in 15 parts of dimethylformamide and the whole is stirred for 2 hours at reflux temperature. Then there are added 4.4 parts of ethyl bromide and stirring at reflux is continued for 16 hours. Ether (160 parts) is added and the solution is washed five times with water. Upon acidification with an excess of concentrated nitric acid, the nitrate salt is crystallized. It is filtered off and recrystallized from a mixture of ethanol and diisopropylether, yielding 1-(p-fluoro-β-ethoxyphenethyl)-imidazole nitrate; M.P. 115–116° C.

EXAMPLE XIV

To a stirred and warmed (50° C.) suspension of 1.8 parts of sodium hydride dispersion 50% in 40 parts of tetrahydrofuran is added portionwise a solution of 8 parts of α-(p-bromophenyl)-imidazole-1-ethanol in 15 parts of dimethylformamide and the whole is stirred and refluxed for 2 hours. Then there are added 4.4 parts of ethyl bromide and stirring at reflux is continued for another 16 hours. Ether (160 parts) is added and the solution is washed five times with water. Upon acidification with concentrated nitric acid, the nitrate salt is crystallized. It is filtered off and recrystallized from a mixture of ethanol and diisopropylether, yielding 1-(p-bromo-β-ethoxyphenethyl)-imidazole nitrate; M.P. 125–126° C.

EXAMPLE XV

To a stirred and warmed (50° C.) suspension of 1.8 parts of sodium hydride dispersion 50% in 40 parts of tetrahydrofuran is added portionwise a solution of 6.6 parts of α-(p-chlorophenyl)-imidazole-1-ethanol in 15 parts of dimethylformamide and the whole is stirred and refluxed for 2 hours. Then there are added 4.4 parts of ethyl bromide and stirring at reflux is continued for another 16 hours. Ether (160 parts) is added and the solution is washed five times with water. After acidification with concentrated nitric acid solution, the nitrate salt is precipitated. It is filtered off and recrystallized from a mixture of ethanol and diisopropylether, yielding 1-(p-chloro-β-ethoxyphenethyl)-imidazole nitrate; M.P. 132–133° C.

EXAMPLE XVI

To a stirred and warmed (50° C.) suspension of 1.8 parts of sodium hydride dispersion 50% in 36 parts of tetrahydrofuran is added portionwise a solution of 7.7 parts of α-(2,4-dichlorophenyl)imidazole-1-ethanol in 15 parts of dimethylformamide and the whole is stirred and refluxed for 2 hours. Then there are added 6.1 parts of cinnamyl chloride and stirring at reflux is continued for another 16 hours. Ether (160 parts) is added and the solution is washed five times with water. Upon the addition of concentrated nitric acid solution, the nitrate salt is precipitated. It is filtered off and recrystallized twice from a mixture of 2-propanol and diisopropylether, yielding 1 - [2,4 - dichloro-β-(cinnamyloxy)phenethyl]-imidazole nitrate; M.P. 91.7° C.

EXAMPLE XVII

The acid addition salts obtained as products in Examples I through XVI are converted to their respective corresponding base form by treatment with a slight stoichiometric excess of dilute sodium hydroxide solution.

EXAMPLE XVIII

To a stirred and warm suspension of 1.8 parts of sodium hydride dispersion 50% in 40 parts of tetrahydrofuran are added dropwise 6.6 parts of α-(o-chlorophenyl)imidazole-1-ethanol dissolved in 15 parts of dimethylformamide at 50° C. Upon completion, there are added 4.4 parts of ethyl bromide and the whole is stirred at reflux temperature for 16 hours. The reaction mixture is diluted with 160 parts of ether. The solution is washed five times with water and acidified with an excess of nitric acid. Upon the addition of diisopropylether, crystallization sets in. The precipitated salt is filtered off and recrystallized from a mixture of ethanol and diisopropylether, yielding 1 - (o - chloro-β-ethoxyphenethyl)imidazole nitrate; M.P. 120.7° C.

EXAMPLE XIX

To a stirred and warm (50° C.) suspension of 1.8 parts of sodium hydride dispersion 50% in 40 parts of tetrahydrofuran is added portionwise a solution of 7.7 parts of α-(3,4-dichlorophenyl)imidazole-1-ethanol in 15 parts of dimethylformamide and the whole is stirred for two hours. Then there are added 4.4 parts of ethyl bromide and stirring is continued for 16 hours at reflux temperature. The reaction mixture is diluted with 160 parts of ether. The solution is washed five times with water and acidified with concentrated nitric acid. The whole is evaporated and the residue is crystallized first from a mixture of diisopropylether and 2-propanol and then from a mixture of ethanol and diisopropylether, yielding 1-(3,4-dichloro-β-ethoxyphenethyl)imidazole nitrate; M.P. 96.9° C.

EXAMPLE XX

To a stirred and warm (50° C.) suspension of 1.8 parts of sodium hydride dispersion 50% in 40 parts of tetrahydrofuran is added portionwise a solution of 6.1 parts of α-o-tolylimidazole-1-ethanol in 15 parts of dimethylformamide and the whole is stirred for 2 hours. Then there are added 5.5 parts butyl bromide and stirring is continued for 16 hours at reflux temperature. The reaction mixture is diluted with 160 parts of ether. The solution is washed five times with water and acidified with concentrated nitric acid. Upon the addition of diisopropylether (80 parts), crystallization sets in. The precipitated nitrate salt is filtered off and recrystallized from a mixture of ethanol and diisopropylether, yielding 1-(β-butoxy-o-methylphenethyl)imidazole nitrate; M.P. 110.6° C.

EXAMPLE XXI

To a stirred and warm (50° C.) suspension of 1.8 parts of sodium hydride dispersion 50% in 40 parts of tetrahydrofuran is added portionwise a solution of 6.6 parts of α-(o-chlorophenyl)imidazole-1-ethanol in 15 parts of dimethylformamide and the whole is stirred for 2 hours. Then there are added 3.1 parts of allyl chloride and stirring at reflux temperature is continued for 16 hours. The reaction mixture is diluted with 160 parts of ether. The solution is washed five times with water and acidified with concentrated nitric acid. The whole is evaporated. The residue is crystallized from a mixture of 2-propanol and diisopropylether and recrystallized from the same solvent-mixture, yielding 1 - [β - (allyloxy)-o-chlorophenethyl]imidazole nitrate; M.P. 81.7° C.

EXAMPLE XXII

To a stirred and warm (50° C.) suspension of 1.8 parts of sodium hydride dispersion 50% in 45 parts of tetrahydrofuran is added portionwise a solution of 6 parts of α-(5-chloro-2-thienyl)imidazole-1-ethanol in 15 parts of dimethylformamide and the whole is stirred for 2 hours. Then there were added 5.5 parts of n-butyl bromide and the whole is stirred at reflux temperature for 16 hours. The reaction mixture is diluted with 160 parts of ether. The solution is washed five times with water and acidified with concentrated nitric acid. The whole is evaporated. The residue is crystallized from a mixture of 2-propanol and diisopropylether and recrystallized from the same solvent-mixture, yielding 1-[2-butoxy-2-(5-chloro-2-thienyl)ethyl]imidazole nitrate; M.P. 74.7° C.

EXAMPLE XXIII

To a stirred and warm (50° C.) suspension of 1.8 parts of sodium hydride dispersion 50% in 40 parts of tetrahydrofuran is added portionwise a solution of 6.6 parts of α-(o-methoxyphenyl)imidazole-1-ethanol in 15 parts of dimethylformamide and the whole is stirred for 2 hours. Then there are added 5.5 parts of n-butyl bromide and stirring is continued for 16 hours at reflux temperature. The reaction mixture is diluted with 160 parts of ether. The solution is washed five times with water and acidified with concentrated nitric acid. The whole is evaporated. The residue is crystallized from a mixture of 2-propanol and diisopropylether and the crude salt is recrystallized from the same solvent-mixture, yielding 1-(β-butoxy-o-methoxyphenethyl)imidazole nitrate; M.P. 76.7° C.

EXAMPLE XXIV

To a stirred and warm (50° C.) suspension of 1.8 parts of sodium hydride dispersion 50% in 40 parts of tetrahydrofuran is added portionwise a solution of 6.1 parts of α-(p-fluorophenyl)imidazole-1-ethanol in 15 parts of dimethylformamide and the whole is stirred for 2 hours. Then there are added 5.5 parts of n-butyl bromide and stirring is continued for 16 hours at reflux temperature. The reaction mixture is diluted with 160 parts of ether. The solution is washed five times with water and acidified with concentrated nitric acid. Upon the addition of 120 parts of petroleumether, the salt is crystallized. It is filtered off and recrystallized twice from a mixture of 2-propanol and diisopropylether, yielding 1-(β-butoxy-p-fluorophenethyl)imidazole nitrate; M.P. 84.3° C.

EXAMPLE XXV

A mixture of 1.8 parts of sodium hydride dispersion 50% and 45 parts of tetrahydrofuran is heated to 50° C. and there are added dropwise 7.7 parts of α-(2,4-dichlorophenyl)imidazole-1-ethanol in 15 parts of dimethylformamide. The whole is stirred and refluxed for 2 hours. Then there are added dropwise 6.5 parts of o-chlorocinnamyl chloride and stirring at reflux temperature is continued overnight. The reaction mixture is cooled and 160 parts of ether are added. The organic phase is washed five times with water, dried and acidified with an excess of nitric acid 65%; the nitrate salt is separated as an oil. The ether is decanted and the oil is stirred in 80 parts of 2-propanol, whereupon crystallization sets in. The solid salt is filtered off and recrystallized from a mixture of ethanol and diisopropylether, yielding 1-[2,4-dichloro-β-(o-chlorocinnamyloxy)phenethyl]imidazole nitrate; M.P. 108.6° C

EXAMPLE XXVI

To a stirred mixture of 1.4 parts of sodium hydride dispersion 50% in 40 parts of tetrahydrofuran is added a solution of 6.4 parts of α-(2,4-dichlorophenyl)imidazole-1-ethanol in 15 parts of dimethylformamide and the whole is stirred at reflux temperature for 2 hours. Then there is added dropwise a solution of 7 parts of p-chlorocinnamyl bromide in 10 parts of tetrahydrofuran (exothermic) and the whole is stirred overnight at reflux temperature. The reaction mixture is cooled and 160 parts of ether are added. The solution is washed six times with 50 parts of water. The organic phase is dried and acidified with nitric acid (conc.): an oily salt is separated which solidifies on scratching. The solid salt is filtered off and recrystallized from a mixture of ethanol and diisopropylether, yielding 1-[2,4-dichloro-β-(p-chlorocinnamyloxy)phenethyl]imidazole nitrate; M.P. 123.5° C.

EXAMPLE XXVII

To a stirred and warm (50° C.) mixture of 1.4 parts of sodium hydride dispersion 50% in 40 parts of tetrahydrofuran is added a solution of 5.6 parts of α-(o-chlorophenyl)imidazole-1-ethanol nitrate in 15 parts of dimethylformamide and the whole is stirred and refluxed for 2 hours. Then there are added dropwise 7 parts of p-chlorocinnamyl bromide dissolved in 20 parts of tetrahydrofuran (exothermic) and the whole is further stirred overnight at reflux temperature. The reaction mixture is cooled and 160 parts of ether are added. The solution is washed six times with water. The organic layer is separated, dried and acidified with nitric acid: an oily salt is separated, which solidifies on scratching. The solid salt is recrystallized from a mixture of ethanol and diisopropylether, yielding 1-[o-chloro-β-(p-chlorocinnamyloxy)phenethyl]imidazole nitrate; M.P. 109.7° C.

EXAMPLE XXVIII

Each of the acid addition salts obtained as products in Examples XVIII through XXVII is converted to its respective corresponding base form by treatment with a slight stoichiometric excess of dilute sodium hydroxide solution.

What is claimed is:
1. A chemical compound selected from the group consisting of 1-[β-Ar-β-(R-oxy)-ethyl]-imidazole having the formula:

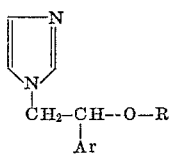

and the therapeutically active acid addition salts thereof, wherein Ar is a member selected from the group consisting of halophenyl, dihalophenyl, lower alkyl phenyl, lower alkoxyphenyl and 5-halo-2-thienyl; and R is a member selected from the group consisting of lower alkyl, lower alkenyl, phenyl lower alkenyl, halophenyl lower alkenyl and lower alkynyl.

2. 1-[o-chloro-β-(hexyloxy)phenethyl]imidazole.
3. 1-[p-fluoro-β-(heptyloxy)phenethyl]imidazole.
4. 1-(β-butoxy-2,4-dichlorophenethyl)imidazole.
5. 1-[2,4-dichloro-β-(allyloxy)phenethyl]imidazole.
6. 1-[2,4-dichloro-β-(octyloxy)phenethyl]imidazole.
7. 1-(2,4-dichloro-β-ethoxyphenethyl)imidazole.
8. 1 - [2,4 - dichloro - β - (2-propynyloxy)phenethyl]imidazole.
9. 1-(2,6-dichloro-β-butoxyphenethyl)imidazole.
10. 1 - [2,4 - dichloro-β-(hexyloxyphenethyl]imidazole.
11. 1-(β-butoxy-2,5-dichlorophenethyl)imidazole.
12. 1-(p-bromo-β-butoxyphenethyl)imidazole.
13. 1-(β-butoxy-p-chlorophenethyl)imidazole.
14. 1-(p-fluoro-β-ethoxyphenethyl)imidazole.
15. 1-(p-bromo-β-ethoxyphenethyl)imidazole.
16. 1-(p-chloro-β-ethoxyphenethyl)imidazole.
17. 1 - [2,4 - dichloro - β - (cinnamyloxy)phenethyl]imidazole.
18. 1-(o-chloro-β-ethoxyphenethyl)imidazole.
19. 1-(3,4-dichloro-β-ethoxyphenethyl)imidazole.
20. 1-(β-butoxy-o-methylphenethyl)imidazole.
21. 1-[β-(allyloxy)-o-chlorophenethyl]imidazole.
22. 1 - [2 - butoxy - 2 - (5 - chloro - 2 - thienyl)ethyl] imidazole.
23. 1-(β-butoxy-o-methoxyphenethyl)imidazole.
24. 1-(β-butoxy-p-fluorophenethyl)imidazole.
25. 1 - [2,4 - dichloro - β - (o-chlorocinnamyloxy) phenethyl]imidazole.
26. 1 - [2,4 - dichloro - β - (p-chlorocinnamyloxy) phenethyl]imidazole.
27. 1 - [o - chloro - β - (p-chlorocinnamyloxy)phenethyl]imidazole.

References Cited

UNITED STATES PATENTS 3,531,494   9/1970   Adolphi et al. _____ 260—309

NORMA S. MILESTONE, Primary Examiner

G. T. TODD, Assistant Examiner

U.S. Cl. X.R.
260—309; 424—273

PO-1050
(5/69)

UNITED STATES PATENT OFFICE
CERTIFICATE OF CORRECTION

Patent No. 3,658,813          Dated April 25, 1972

Inventor(s) Erik Fred Godefroi et al

It is certified that error appears in the above-identified patent and that said Letters Patent are hereby corrected as shown below:

Column 3, Table 1, line 74, "6=Cancida tropicalis" should read -- 6=Candida tropicalis --.

In Column 4, line 26, "Streptococcus pyogenes and 0.05 ml. for the other organisms" should be omitted.

In Column 5, Table 11, line 11, under "R", "$CH_2-CH_2=CH-PH$" should read --- $CH_2-CH=CH-PH$ ---.

In Column 5, Table 11, line 37, "+ growth/ o no growth" has been omitted.

In Column 5, Table 11, line 38, "phialophord" should be omitted.

In Column 6, line 50, "M.P. 143° P" should read --- M.P. 143 °C---.

In Column 7, lines 42 and 43, "1-[p-fluoro-B-(heptyl)phenethyl]" should read --- 1-[p-fluoro-B-(heptyloxy)phenethyl] ---.

In Column 9, line 39, "filtered of" should read --- filtered off ---.

In Column 10, line 42, "100 parts" should read ---1000 parts ----.

In Column 14, line 56, "M.P. 123.5° C" should read --- M.P. 123.4° C---.

Signed and sealed this 27th day of February 1973.

(SEAL)
Attest:

EDWARD M.FLETCHER,JR.
Attesting Officer

ROBERT GOTTSCHALK
Commissioner of Patents